Patented Sept. 3, 1929.

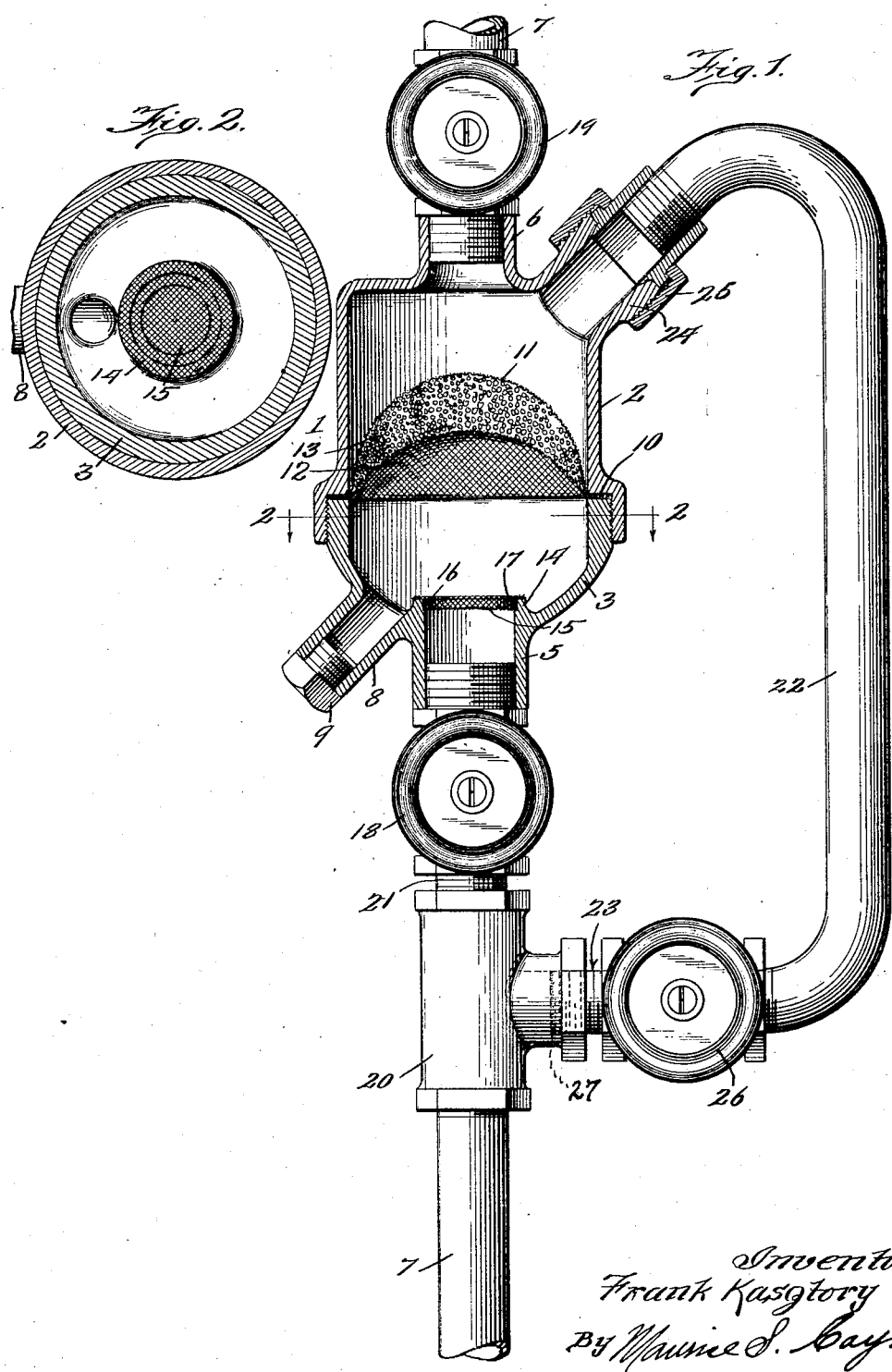

1,726,839

UNITED STATES PATENT OFFICE.

FRANK KASZTORY, OF CHICAGO, ILLINOIS, ASSIGNOR OF ONE-HALF TO IGNATIUS IZSAK, OF CHICAGO, ILLINOIS.

HOUSEHOLD WATER FILTER AND STRAINER.

Application filed February 21, 1928. Serial No. 255,912.

The invention relates to improvements in a water filtering and straining device, and is especially useful for domestic or household use where the device may be installed in the house water line at a point in advance of the place of discharge of the water for consumption, and it consists in certain peculiarities of the construction, noval arrangement and operation of the various parts thereof, as will be hereinafter more fully set forth and specifically claimed.

The principal object of the invention is to provide a water filter which shall be simple and inexpensive in construction, strong, durable, and efficient in operation, and so made that the device can be easily and rapidly cleaned without removing the same or without disconnecting the same from the conduit through which the filtered water is drawn, or without disconnecting it from the conduit which supplies it with water.

Another object of this invention is the provision of a device of the character described which may be so connected with the house supply system as to efficiently filter the water leading to the faucet where it is drawn for consumption, and means for cleaning the said filter by causing a flow of water in a reverse direction.

A further object of this invention is the provision of a device of the character described which is adapted for installation in a domestic water supply for filtering the water before it is drawn for consumption and a by-pass associated with said filtering means for cleaning the same.

A still further object of the invention is the provision of a device of the character described which is adapted for installation in a household water supply whereby the water may be filtered before it is drawn for use, and means associated with said filtering devices for reversing the flow therethrough for cleaning the same.

With the foregoing and other objects in view, which will appear as the description proceeds, my invention consists in the construction, arrangement and combination of parts of my apparatus whereby the objects contemplated are attained, as hereinafter more fully set forth, pointed out in the appended claim, and illustrated in the accompanying drawings, in which:

Fig. 1, is a longitudinal sectional view of a filtering device embodying my invention; and Fig. 2, is a view taken on line 2—2 of Fig. 1, looking in the direction of the arrows.

Referring to the specific embodiment of the invention illustrated by way of example in the drawings, the device comprises a casing 1 having an upper portion 2 and a lower portion 3, the said portions being securely held in operative engagement with each other by means of the threaded connection 4, or in any other suitable manner. The said casing 1 may be of any suitable size, form and material, but preferably of metal and cylindrical in shape as shown. This casing or receptacle has at its lower portion, and preferably in its bottom, an inlet 5, for a supply of water, and has in its upper end a projection or nozzle 6, to which a pipe 7 may be connected leading to a faucet (not shown). The casing 1 is also provided at its lower end with a nipple or projection 8, said projection being disposed at an angle to said inlet 5, said nipple 8 being adapted to be closed by a threaded plug 9, which plug may be readily removed when desired. The upper part of the portion 3 is exteriorly threaded, as shown, and is adapted to be received in the interiorly threaded enlarged lower part of the portion 2 of the casing 1. The portion 2 is provided adjacent its enlarged interiorly threaded part with a shoulder 10, or the like, which shoulder is adapted to engage the upper edge of the portion 3 for making a water tight connection between the upper and lower portions of the casing 1.

Located in the casing 1, are a pair of strainers 11 and 12, of any suitable material, such as copper or the like, said strainers being concave, as shown, and of a different radius of curvature, so as to form the space 13 between them, and each is provided with a horizontally disposed annular flange, which is adapted to be interposed between the shoulder 10, of the portion 2, and the upper edge of the portion 3, whereby said strainers may be securely and rigidly held in place, and also act as a packing, which will prevent the passage of water between the upper and lower portions of the casing 1. The openings in said strainers 11 and 12 may be of any suitable size however, the openings in the lower strainer 12 should be of a larger diameter than those in the upper strainer 11. The space 13 formed between the strainers 11 and 12 may be filled with any suitable filtering material, such as gravel, or the like, whereby the water passing from the lower portion of the casing to the upper portion thereof will be not only strained, but also filtered.

The inner edge of the inlet 5, is adapted to extend a small distance above the bottom of the portion 3, as shown at 14, and is adapted to receive across its mouth a screen or strainer 15, of any suitable material, and having openings therein of any suitable size. The screen or strainer 15 may be secured across the mouth of the inlet 5 in any suitable manner. In the embodiment illustrated in the drawings the portion 14 is provided on its inner side near the upper edge thereof with a counter sunk annular groove 16, in which is adapted to be snapped or secured the upstanding annular flange 17 provided on the screen 15, the said flange 17 being bent, as shown, to engage the upper edge of the portion 14. By securing the screen 15 in the manner above described, the same will be held against being displaced by the inflow of the water into the casing 1.

The casing 1 is adapted to be connected in the water conduit 7, by means of the inlet 5, and the outlet 6, which conduit is provided at a point immediately adjacent the inlet 5, with a valve 18, of any suitable and well known construction, and at a point immediately adjacent to the outlet 6, with a similar valve 19, for a purpose to be hereinafter described. A T joint 20, of any suitable and well known construction, has one end thereof connected by a nipple 21, or in any other suitable manner, to the valve 18, and the other end thereof connected to the pipe or conduit 7. The other outlet of the T joint 20, is connected to one end of a by-pass 22 by means of a nipple 23, or in any other suitable manner, the other end of the by-pass 22 being connected with an outer nozzle or projection 24, provided in the top of the casing 1, adjacent the outlet 6, as shown, said connection being made by means of a coupling 25 of the ordinary or any well known construction. A valve 26, of the ordinary or any well known construction is provided in the by-pass 22, preferably at a point near its connection with the T joint 20, as shown.

The operation of the device is as follows: The water to be filtered and strained is supplied to the casing 1, through the supply pipe 7, from which it will enter said casing under pressure, the valve 26, being normally closed, and the valves 18 and 19 being normally open. In passing through the casing the water will be thoroughly strained and filtered by means of strainers 11, 12 and 15, and the filtering material located in the space 13, prior to its discharge at the faucet.

When it is desired to clean the casing, the valves 18 and 19 are closed, and the valve 26, is opened and the plug 9, removed. This will cause a flow of the water through the by-pass 22, and through the casing in a direction opposite to the normal flow therethrough, the water entering the top of said casing under pressure. This will cause a complete and thorough cleaning of the screens or strainers and the filtering material, without having to disconnect the same from the conduit. After the casing has been cleaned, the plug 9, may be replaced to close the nozzle 8, the valve 26, closed, and the valves 18, and 19, opened, permitting a flow of water through the casing to the faucet.

In order to have strained water for cleaning the device, and thus prevent the accumulation of dirt and foreign matter on top of the screen 11, I provide a screen or strainer 27, similar to the strainer 15, at the mouth of the nipple 23. This will prevent any particles from entering the by-pass 22, when the device is being cleaned as described hereinbefore.

It will thus be noted that I have provided a device for straining and filtering water for household uses, which is simple in operation, inexpensive to install and manufacture, readily and quickly cleaned without having to disconnect the same from the conduit in which it is located, and whereby the objects contemplated are attained.

I am aware that changes may be made in the design, size and shape of the device, and I reserve the right to make all such adaptations of and changes in the construction of my invention as fairly fall within the scope of the appended claim.

What I claim and desire to secure by Letters Patent of the United States is:—

In a filtering and straining device, the combination of a casing comprising an upper portion having a depending enlarged interiorly threaded section, a shoulder formed in said section, a lower portion having the upper surface thereof exteriorly threaded and adapted for threaded engagement within said enlarged section, an inlet provided in said lower portion and an outlet in said upper portion, a pair of concave strainers disposed intermediate said lower and upper portions and held in place between said shoulder and the upper edge of said lower portion, said strainers being of a different radius of curvature, whereby a substantial space is formed between the same, filtering material in said space, the lowermost portions of said strainers being provided with an annular substantially horizontally disposed section, whereby the said strainers are adapted to act as a packing for said connection between said upper and lower portions of said casing, and means for causing a flow through said casing in the reverse direction.

In testimony whereof I affix my signature.

FRANK KASZTORY.